Nov. 27, 1962 F. F. BATEMAN 3,066,198
METHOD AND MEANS OF DETECTING RELATIVE DISPLACEMENT
OF THE PERIODIC LOCATION OF INDICIA ON
A MOVING TAPE OR SIMILAR ARTICLE
Filed June 13, 1960 7 Sheets-Sheet 1

Fig.1

INVENTOR.
FRANK F. BATEMAN
BY Parrott & Richards
ATTORNEYS

Fig. 2

INVENTOR.
FRANK F. BATEMAN
BY
Parrott & Richards
ATTORNEYS

INVENTOR.
FRANK F. BATEMAN
BY Parrott & Richards
ATTORNEYS

INVENTOR.
FRANK E. BATEMAN

Nov. 27, 1962 F. F. BATEMAN 3,066,198
METHOD AND MEANS OF DETECTING RELATIVE DISPLACEMENT
OF THE PERIODIC LOCATION OF INDICIA ON
A MOVING TAPE OR SIMILAR ARTICLE
Filed June 13, 1960 7 Sheets-Sheet 5

INVENTOR.
FRANK F. BATEMAN
BY
*Parrott & Richards*
ATTORNEYS

INVENTOR.
FRANK F. BATEMAN
BY
Parrott & Richards
ATTORNEYS

United States Patent Office 3,066,198
Patented Nov. 27, 1962

3,066,198
METHOD AND MEANS OF DETECTING RELATIVE DISPLACEMENT OF THE PERIODIC LOCATION OF INDICIA ON A MOVING TAPE OR SIMILAR ARTICLE
Frank F. Bateman, Charlotte, N.C., assignor to Jefferson Standard Broadcasting Company, a corporation of North Carolina
Filed June 13, 1960, Ser. No. 35,824
27 Claims. (Cl. 179—100.2)

The present invention relates to a method and means of detecting relative displacement of the periodic location of indicia on a moving tape or similar article, and more particularly to a method and means for detecting relative displacement of the periodic location of indicia on a moving tape that has lateral tracks thereon which are scanned by a scanning head that moves across the tape over the tracks in a path slightly inclined with respect to the tracks so that when the tracks are displaced slightly with respect to the scanning head the change in the scanning relation will be indicative of the direction and magnitude of displacement. The detection of displacement may be in the form of an electrical signal and may be applied directly to the tape drive means to adjust the speed of the tape and thereby compensate for said displacement.

In many uses of longitudinally traveling tapes or webs it is desirable and often critical that the tape or web travel at a constant speed, as in processing operations, or that the position of elements on the tape remain synchronized with other elements. To maintain constant speed or synchronization, deviations must be detected precisely both in magnitude and direction so that compensation can be made through adjustment of the drive means.

The maintenance of a constant speed for the purpose of maintaining precise periodic positioning of elements on the tape is especially important where indicia or other markings on the tape are cofunctional with elements operating independently of the tape but in timed sequence therewith to produce a compo-side effect or signal, such as in the playback operation of a video tape recorder.

In the operation of video tape recorders of present standard construction there exists a basic problem of causing the rotating video pick-up heads, during the playback operation, to track precisely over the area on the tape where the FM video signal information was laid down during the recording operation. To accomplish satisfactory tracking, highly precise control of the speed and longitudinal displacement of the tape tracks with respect to the rotating pick-up heads is essential. Thus means must be provided to produce a signal that indicates the relative position of the tape tracks and can be used to "lock" the tape to the rotation of the headwheel in playback.

Standard video tape recorders are presently controlled by a 240 cycle pulse recorded on longitudinal "control tracks" along one edge of the tape, the pulse being derived directly from a tone wheel on the same shaft as the video head wheel. During playback this pulse is picked up from the tape and compared with the pulse generated by the video pick-up head tone wheel and the phase relation information is used to control the rate of longitudinal displacement of the tape through a servo chassis and the capstan drive.

This provides a means of control, but requires the use of a portion of the tape for control purposes rather than for the video signal or other desirable purposes, such as additional audio or cue tracks, and more efficient and advantageous use of the tape would result if control of the tape speed with respect to the video head wheel could be obtained from the FM video signal tracks themselves without the necessity of recording an auxiliary track solely for control purposes. This would eliminate the necessity of a separate pick-up head and amplifier for the control signal. However, extracting precise displacement information from the signals picked up by the video heads of the present video recorders is impossible as the signal picked up does not indicate the direction in which the video head is slipping off the track as the signal obtained when the head slips off below the track is identical to the signal when the head slips off above the track.

The present invention overcomes the above shortcomings so that precise longitudinal tape displacement information, including direction of displacement, can be obtained from the signal picked up by the video heads. This is accomplished by introducing a slight inclination between the path of the pick-up heads and the video tracks of the tape with the head path and tracks initially positioned for synchronized operation with the maximum overlap at the center and slightly displaced at both ends due to the inclination. Upon slight deviation in the relative displacement of the tape, as from a deviation in the rate of travel, the pick-up head will further slip off one end of the track causing a slight reduction in signal level relative to the normal condition, and the other end of the same track will slip on or nearer the center of the track, causing a slight increase in signal level relative to the normal condition. This difference in location of the slipping away from or toward the normal tracking position will produce a corresponding difference in the signal picked up by the heads with the signal indicative of the direction of deviation as well as the magnitude of deviation.

This invention is particularly adaptable to video tape recorders as the signal picked up by the head from the tape tracks is used in an FM circuit, which does not require complete overlap of the tape track by the pick-up head to produce a satisfactory FM signal, and the displacements due to the inclination imparted by the present invention plus the displacement resulting before detection and compensation are not sufficient to disrupt satisfactory operation of the recorder. Thus no modifications of the tape, pick-up head, or other elements of the recorder are necessary to maintain continued transmission when the present invention is incorporated in a video tape recorder.

In the preferred embodiment the inclination of the FM video track with respect to the path of the head wheel is obtained by tilting the head wheel during playback so that its axis of rotation, which is normally parallel to the tape, is tilted a very slight amount, in a plane parallel to the plane of the tape. This tilting can be accomplished by tilting the entire head wheel panel assembly with respect to the tape transport panel. In a conventional video tape recorder where the length of the track is 1.84 inches long and 0.010 inch wide and has a pitch of .0156 inch, a tilt of about 0.06° will produce a satisfactory inclination of the head path with respect to the tracks.

Another method of obtaining an inclination of the video tracks with respect to the pick up head path is to longitudinally stretch one side of the tape so as to distort the track to an inclined position with respect to the pick up head path. This longitudinal stretching can be produced by passing the tape over a curved surface adjacent the head wheel assembly with the curvature of the surface at one edge of the tape being less than the normal curvature of the tape whereby that edge of the tape is forced outwardly to longitudinally stretch the edge of the tape.

A further method of producing an inclination of the track with respect to the pick up head path is to introduce a very slight nutation in the rate of tape travel as by using a tape capstan that is mounted off center a very slight amount thereby fluctuating the speed of the tape and creating a predetermined varying inclination between the tracks and the pick up head path.

The signal obtained by the present invention may be fed into an oscilloscope with the scope presentation exhibiting a saw tooth modulation, the amplitude of which is a function of the amount of tracking displacement and the phase for the two possible directions of tracking displacement being 180° apart. Also, the signal may be fed through a servo chassis to provide control for the capstan drive motor to thereby directly compensate for the deviation. This can be done by conducting the signal through an infinite impedance detector and an amplifier and smoothing network to obtain a smooth sine curve and comparing the phase of this curve with the phase of a reference signal, such as a pulse obtained from the frequency of the head wheel. When the tracks of the tape are synchronized with the path of the pick-up heads the maximum pulse will result at the center of the track and the reference signal is set up in phase with the signal from this position of tape and pick-up head, but when the track is displaced in one direction the maximum pulse will be at one end of the track and the signal will be 90° out of phase with the reference signal, and when the track is displaced in the other direction the maximum pulse will be at the other end of track and the signal will be 270° out of phase with the reference signal. The difference in phase can be used to rotate a Selsyn unit, which in turn increases or decreases the frequency of the motor that drives the tape capstan so as to compensate for the deviation.

From the above it is apparent that the present invention provides a simple, reliable and efficient method and means of detecting deviations in the rate of travel of the tape and relative displacement of the track and the pick up head. In addition the present invention eliminates the need for using a portion of the tape as an auxiliary track solely for control purposes so that the area of the tape conventionally used for the control track can now be used for other functions such as an increased video track or in additional audio channel, and the control pick up head and amplifier can be eliminated.

Further features and advantages of the present invention will be apparent from the following description and drawings in which.

Although the present invention is described herein in terms of its application to a video tape recorder, it is obvious that the invention is applicable as well to any use of a traveling tape or web wherein it is desirable to detect or control deviations in the speed or relative displacement of the tape.

The preferred embodiment of the present invention has been incorporated in an RCA television tape recorder, type TRT–1A, made by Radio Corporation of America, Camden, N. J. The elements carried by the tape transport panel of this tape recorder, including the elements of the present invention, are illustrated in the accompanying drawings. The other elements of the tape recorder are not illustrated as they are not pertinent to the present invention.

Figure 1:
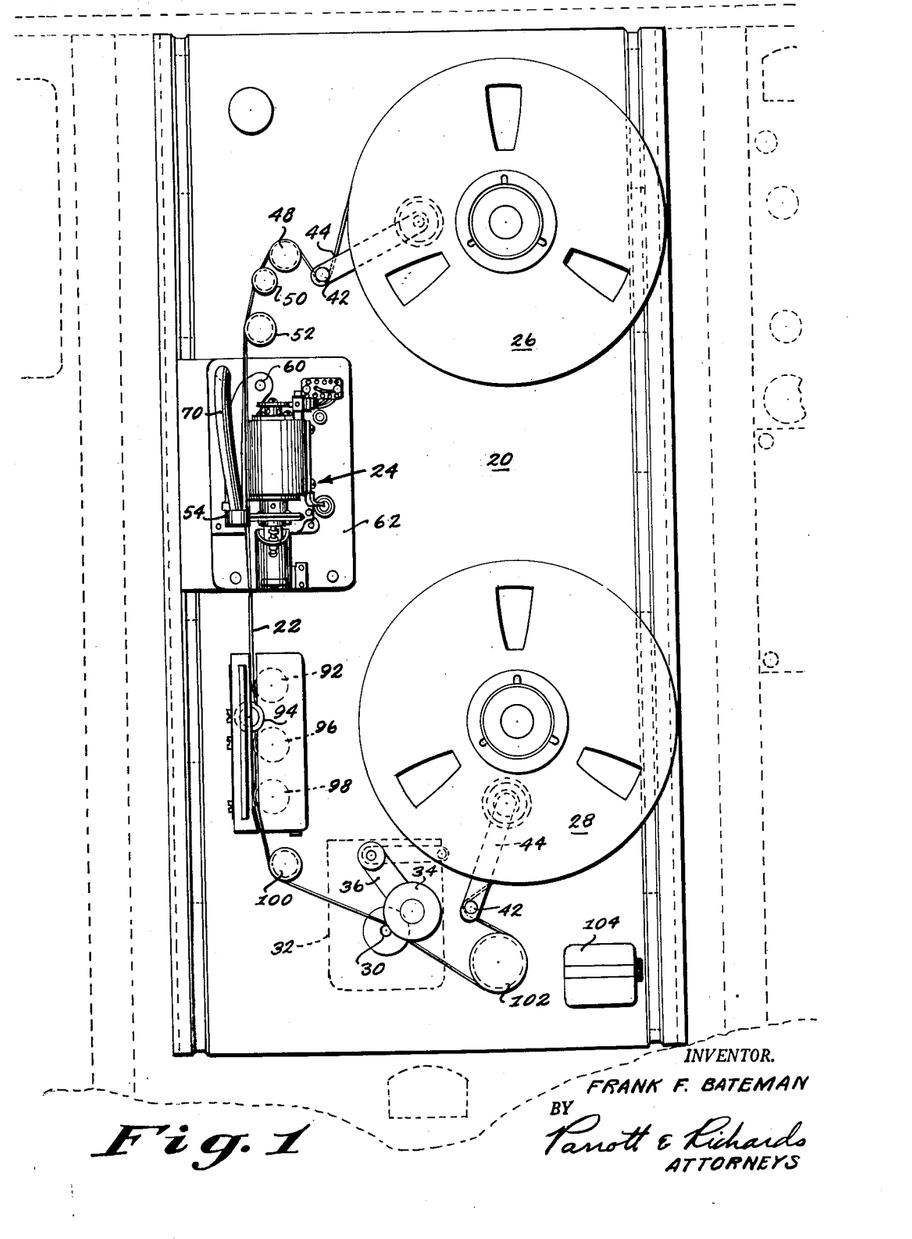
FIG. 1 is a front elevational view of the tape transport panel of a video tape recorder.
Figure 2:
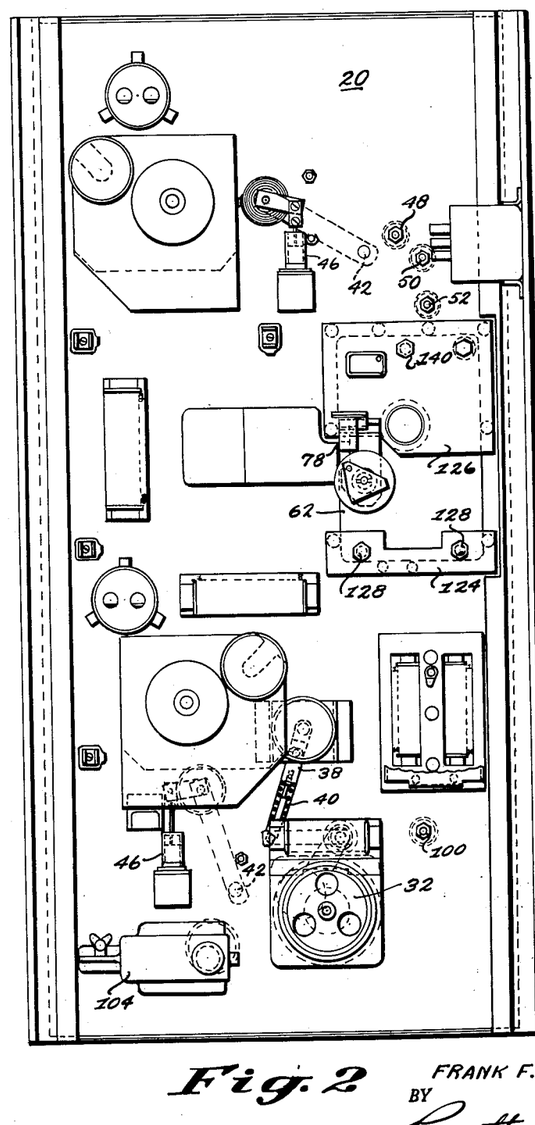
FIG. 2 is a rear elevational view of the tape transport panel of FIG. 1.

As seen in FIGS. 1 and 2, the tape transport panel 20 carries the tape 22 and the pick-up head wheel assembly 24. The elements of the head wheel assembly 24 pick up the signals from the tape that are transformed by the tape recorder into video signals.

As illustrated in FIG. 1, the tape 22 is unwound from a supply reel 26 mounted at the top of the tape transport panel 20, passes through the pick-up head wheel assembly 24, and is rewound on the take-up reel 28. The supply and take-up reels 26, 28 apply tension to the tape, with the tape being driven by a capstan 30 mounted on the tape transport panel 20 adjacent the take-up reel 28.

The tape drive capstan 30 is driven by a conventional 3-phase electric motor 32 mounted on the back of the tape transport panel 20 as seen in FIG. 22. The tape 22 is maintained in driven contact with the capstan 30 by an idler roll 34 that applies pressure to the tape to hold it against the drive capstan. The idler 24 is pivotally mounted at the end of one arm 36 of a bell crank that is pivoted by a solenoid 38 mounted on the back of the tape transport panel 20. The solenoid piston 40 is normally spring-urged to force the idler roll 34 against the capstan 30 and when it is desired to remove the tape, or to wind or unwind by driving the reels at a rapid rate, the solenoid can be activated to lift the idler roll 34 away from the capstan 30.

Pivotally mounted tensioning rolls 42 are mounted adjacent both the supply reel 26 and the take-up reel 28 and displace the tape so as to take up any slack as the tape is unwound from the supply reel 26 and wound on the take-up reel 28. These tensioning rolls 42 are mounted at the ends of pivoted arms 44 which are connected to solenoids 46 operable to relax the tension of the rolls 42.

The tape 22 is unwound from the supply reel 26 and passes under the tensioning roll 42 and over a guide post 48 which guides the tape past the master erase-head 50 that cleans previous markings from the tape prior to recording by the head wheel assembly 24. This master erase-head 50 is inoperative during playback operation of the video tape recorder so that the markings previously recorded on the tape will remain and be picked up as the tape passes through the pick-up head wheel assembly. A second guide post 50 positions the tape for passage through the pick-up head wheel assembly 24.

The pick-up head wheel assembly 24 includes a pivoted vacuum shoe 54 that holds the tape against a rotating head wheel 56. This head wheel 56 carries pick-up heads 58 sensitive to the markings on the tape and transmits the signals from the pick-up heads 58 to the other elements of the video tape recorder for eventual transmission of television waves.

The vacuum shoe 54 is pivotally suspended from a lug 60 at the top of the head wheel assembly panel 62 and as seen in FIGS. 3 through 7 the shoe has a tape contacting surface 64 arcuately shaped to coincide with the periphery of the head wheel 56. As seen most clearly in FIG. 3, the tape contacting surface 64 of the shoe has a central peripheral slot 66 in which the tape 22 is slightly displaced by the head wheel 56 to insure continuous contact therewith. The tape is maintained at the tape contacting surface 64 by means of vacuum slots 68 on either side of the central peripheral slot 66. The vacuum in these slots 68 is maintained by the vacuum tube 70 which connects the slots 68 to a vacuum pump (not shown).

Figure 3:
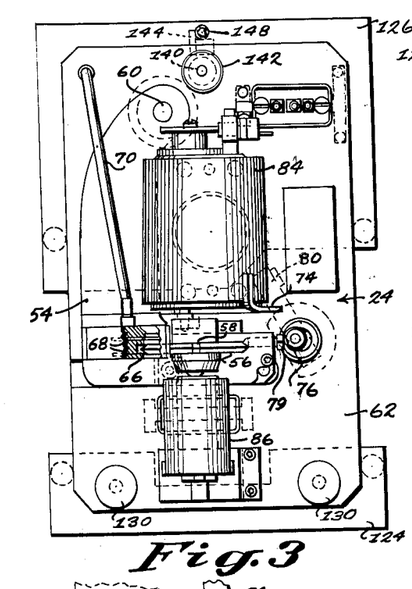
FIG. 3 is an enlarged front elevational view of the head wheel panel of the video tape recorder of FIG. 1 showing the elements in the operating position.
Figure 4:
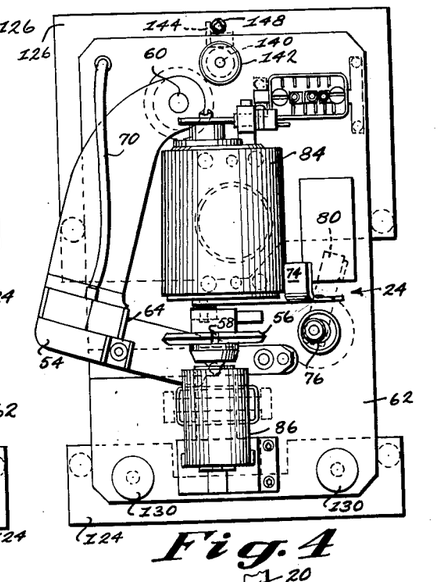
FIG. 4 is a view similar to FIG. 3 showing the elements in an open non-operating position.
Figure 7:
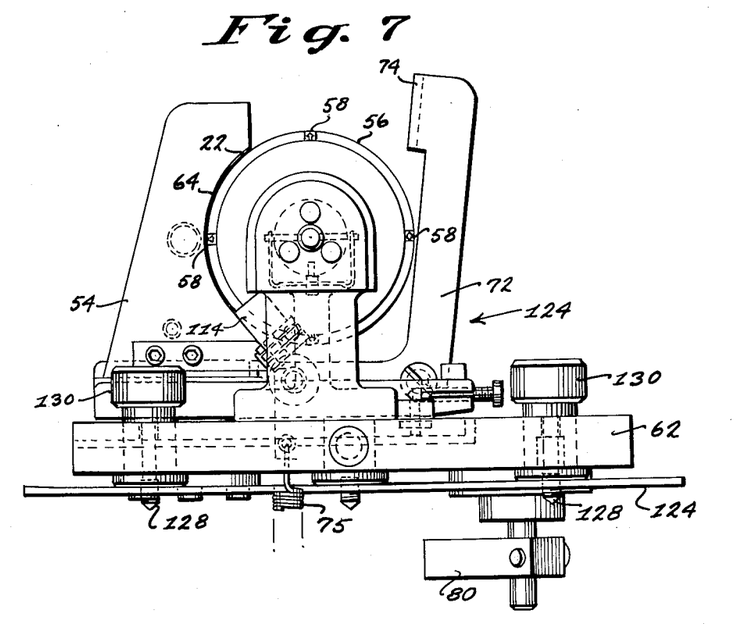
FIG. 7 is an enlarged top plan view of the head wheel panel of FIG. 3.

The vacuum shoe 54 is held in the operative position shown in FIG. 3 by the pivoted latch 72, which is locked in place by the manual lever 74 and locking spring 75 (FIG. 7). The position of the shoe 54 is determined by a cam 76 rotatably mounted on the head wheel panel 62 and against which a threaded bolt 79 extending from the shoe 54 abuts. The cam position is adjusted for fine adjustment of the vacuum shoe by means such as a motor and gear train (not shown) that is controlled by the depth of penetration of the head wheel 56 and tape 22 into the center slot 66 of the shoe 54. The motor and gear train adjust the position of a stop against which a lever arm 80 fixed to the cam 76 abuts when the vacuum shoe is in the closed position.

The head wheel 56 is mounted on a shaft 82 extending downwardly from a drive motor 84 and having its lower end mounted in a thermoplastic mounting 86 that carries brushes 88 aligned with slip rings 90 on the shaft for pick-up of the signals from the pick-up heads 58 and transmission to the other elements of the video tape recorder.

The head wheel 56 carries four pick-up heads 58 that are equally spaced at 90 degree intervals about the periphery of the head wheel so that, as seen in FIG. 7, at least one pick-up head 58 is maintained in contact with the tape 22, which extends about 113 degrees around the periphery of the head wheel 56.

After the tape 22 passes through the pick-up head wheel assembly 24, it passes over an audio erase head 92 which, in recording operation, erases a portion of the tape at one side to clean that portion of the tape for recording of audio signals, but in playback operation this audio erase head 92 is inoperative.

The tape 22 then passes over a third guide post 94 that holds the tape so that it will be in contact with the audio record and playback head 96 located immediately therebelow. The tape then passes over the audio simultaneous playback head 98 that is used during recording to check the operation of the audio record head 96.

The tape then passes over a fourth guide post 100 from which it passes over the drive capstan 30 described above and over a footage counter idler roll 102 connected to a counter mechanism 104 that measures and indicates the amount of tape recorded or played back and also is used as a reference to indicate particular portions of the tape.

Figure 8:
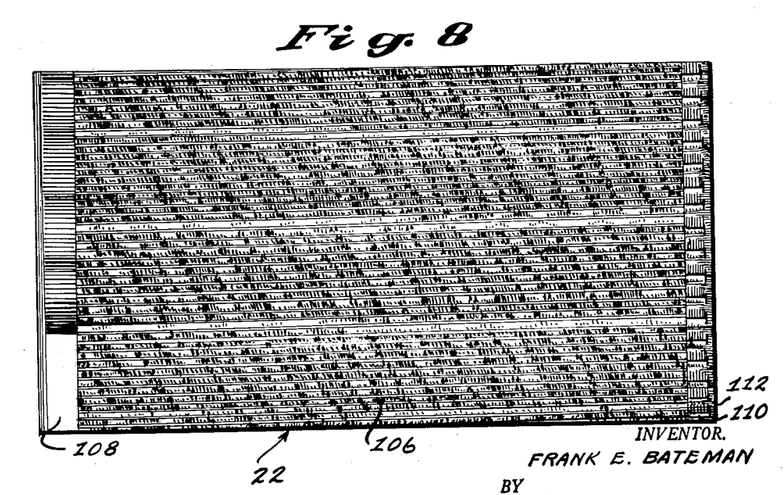
FIG. 8 is an enlarged elevational view of a section of video tape.

The mechanism described above is typical of conventional video tape recorders and particularly to the RCA television tape recorder, type TRT-1A, mentioned previously. This mechanism is designed for use with a tape, such as that illustrated in FIG. 8, having laterally extending video tracks 106 of magnetic characteristics that are scanned by the electro-magnetic pick-up heads 58 to obtain an electrical signal. To one side of these video tracks 106 is an audio track 108 that is scanned by the audio record and play-back head 96 to produce the sound accompanying the video signal. On the other side of the tape are a control track 110 and a cue track 112. The control track is used in conventional recorders as a comparison against a reference signal to indicate displacement of the tape with respect to a control track pick-up head 114 (FIG. 7).

The tape is conventionally made of two inch wide Mylar base material with an oxide coating of magnetic oxide particles oriented in the transverse direction. During recording the magnetic particles in the video tracks are arranged so that the electro-magnetic pick-up heads will pick up a video signal therefrom. This signal is frequency modulated and thus slight displacement of the scanning relationship of the pick-up heads 58 with respect to the video tracks 106 can occur without noticeably affecting the level of the video signal.

In conventional operation, the head wheel 56 is positioned for rotation in a plane perpendicular to the direction of motion of the tape and rotates at 240 r.p.s. with the tape being pulled through at 15 inches per second. The video tracks 106 are recorded with a pitch of 0.0156 inch so that the path of the pick-up heads 58 on the tape will be parallel with the video tracks 106. The width of each head 58 and track is 10 mils and the vertical space between tracks is 5.6 mils. There are approximately 18.4 TV lines recorded on each video track 108 and due to the overlapping of the pick-up heads 58, there are either 16 or 17 lines picked up by each head. Each TV frame includes 525 lines which comprises 32 transverse tracks or a half inch along the direction of tape motion.

As the control track 110 occupies a portion of the surface of the tape, it would be desirable to eliminate the control track for use of that area of the tape for other purposes, such as an additional audio track. This would also eliminate the need for a control pick-up head and amplifier. In this regard it would be desirable if the signal picked up from the video track itself could be used in some way to indicate deviations in displacement of the head path and the track, but the signal obtained from the video track by conventional recorders does not indicate the direction of error when the head wheel path and video track are displaced.

Figure 9:
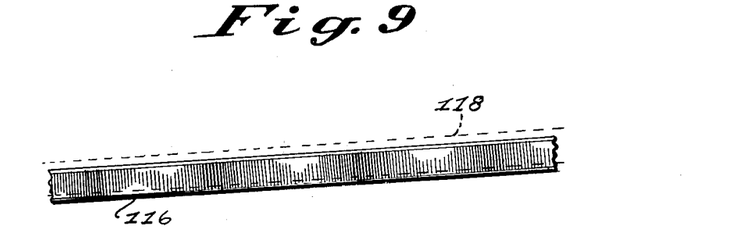
FIG. 9 is an enlarged view in exaggerated proportions of a single track of the video tape of FIG. 8 showing in dotted lines the position of the path of a pick up head displaced with respect to the track.

A section 116 of a single video track is illustrated in FIG. 9, showing in dotted lines the position of the head wheel path when the head wheel path is displaced with respect to the video track. When this occurs, the level of the signal picked up by the pick-up heads is less than that obtained during full scanning, and the level of the signal as compared with the maximum level being indicative of the magnitude of displacement. However, there is no indication of whether the displacement is ahead or behind and thus the video track and pick-up heads have been unsatisfactory for use in detecting relative displacement.

However, the present invention provides a method and means wherein the video track can be utilized to indicate both magnitude and direction of relative displacement of the head path with respect to the video track. This is accomplished by providing an inclinnation of the head wheel path with respect to the video track so that as seen in FIGS. 10 through 12, a wave pattern will be produced that is indicative of the relationship between the head path and video tracks.

Figure 10:
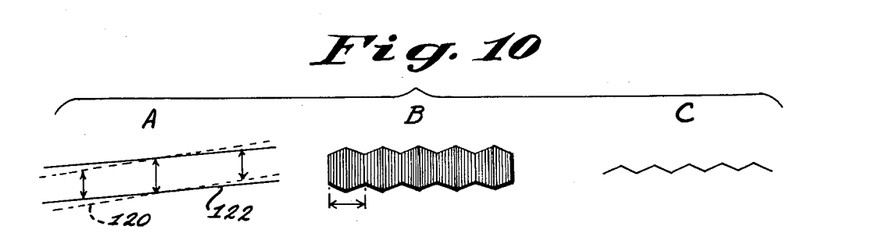
FIG. 10 is a schematic drawing in exaggerated proportions of the tape track and pick-up head path, output signal, and detected wave pattern obtained by the present invention when the tape track and head path are synchronized.

The inclination and the position of the head path 120 and video track 122 in synchronized position is shown in FIG. 10A (in greatly exaggerated proportion), wherein it is seen that the maximum coincidence is at the center with the ends being partially out of scanning relation, the head path 120 slipping off below the video track 122 at the left and slipping off above at the right.

FIG. 10B illustrates the FM output from a 2 x 1 FM switcher with the maximum level at the center of the cycle. This represents the output obtained from the scanning relation of FIG. 10A. When the output represented in FIG. 10B is transformed into a wave pattern, it will have substantially the form of FIG. 10C.

Figure 11:
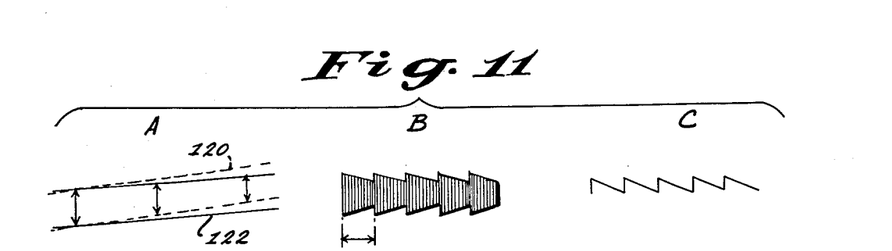
FIG. 11 is a view similar to FIG. 10, showing the tape track displaced in advance of the pick-up head path.
Figure 12:
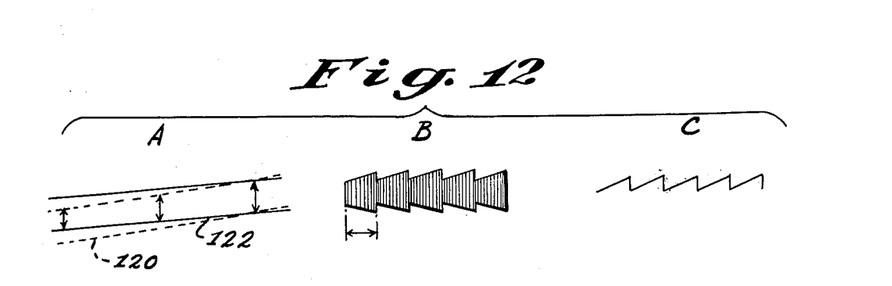
FIG. 12 is a view similar to FIG. 10, showing the tape track displaced behind the pick-up head path.

When the video track 122 is displaced in advance of the head path 120, the condition will be as illustrated in FIG. 11A where the maximum coincidence has shifted to the left. This produces the output shown in FIG. 11B and the wave pattern in 11C.

When the video track 122 falls behind the head path 120, the elements will be positioned as illustrated in FIG. 12A with maximum coincidence having shifted to the right to produce the output and wave pattern of FIGS. 12B and 12C, respectively.

By comparing FIGS. 11C and 12C, it is seen that the direction of displacement is indicated by the direction of the saw-tooth wave pattern and the magnitude of displacement is indicated by the amplitude of the wave pattern. Thus the present invention provides a method of indicating both magnitude and direction of displacement.

In the preferred embodiment the inclination of the pick-up head path with respect to the video track is accomplished by pivotally mounting the pick-up head wheel panel 62 so that the entire panel can be pivoted to produce the inclination. To accomplish this, the head wheel panel 62, as seen in FIGS. 3–6, is secured to a bottom plate 124 and a top plate 126 which extend across the back of the head wheel panel 62. The bottom plate 124 is secured to the panel by lugs 128 that extend through the head wheel panel 62 and threaded nuts 130 secured to lugs 128 on the front of the panel 62. The bottom plate 124 extends behind the adjacent portions of the tape transport panel 20 and is secured thereto by any convenient means. The mounting of the bottom plate 124 to the tape transport panel 20 serves as a pivot for positioning of the head wheel panel 62 with respect to the tape transport panel 20.

The top plate 126 is similarly attached to the head wheel panel 62 by means of a threaded lug 140 and a corresponding nut 142 at the top center of the head wheel panel 62. The bottom of the top plate 126 is mounted on the tape transport panel 20 by any suitable means. The spacing between the attachment of the top plate 126 to the head wheel panel 62 at the top and to the tape transport panel 20 at the bottom permits slight pivoting to displace the head wheel panel 62 with respect to the tape transport panel 20 as will presently be described.

Figure 5:
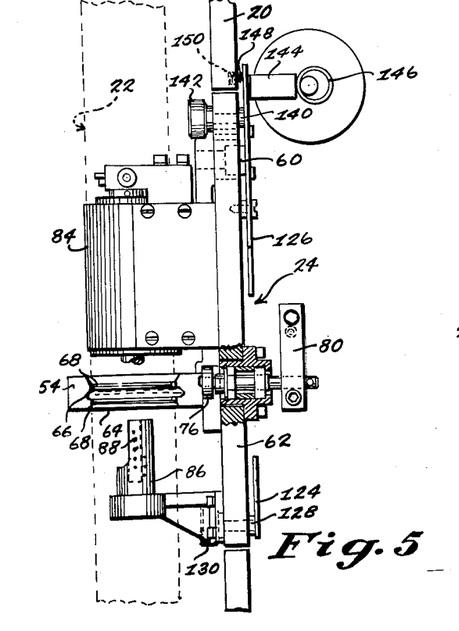
FIG. 5 is a side elevational view partially in section of the head wheel panel of FIG. 3 with the head wheel removed for clarity.

At the top of the back face of the top plate 126 a cam follower 144 is mounted and extends rearwardly. This cam follower 144 engages an eccentric cam ring 146 and is held thereagainst by a coil spring 148 mounted in a recess 150 in the tape transport panel 20 above the head wheel panel 62. This spring 148 is biased against the front face of the top plate 126 to maintain the cam follower 144 in following relation with the cam ring 146. The cam ring 146 is designed so that when the surface closest to its center of rotation is in engagement with the cam follower 144 the top plate 126 will hold the head wheel panel 62 in the plane of the tape transport panel 20 so that the axis of rotation of the head wheel 56 will be parallel to the direction of travel of the tape 22, as illustrated in FIG. 5. In this position the head wheel path 118 and the control tracks 110 will be parallel as shown in FIG. 9. This position is used during recording operation of the tape recorder.

Figure 6:
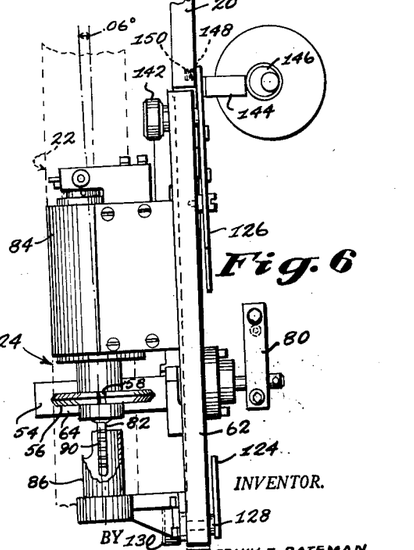
FIG. 6 is a view similar to FIG. 5 showing the head wheel panel tilted with respect to the tape transport panel and with respect to the tape.

During play back the cam ring 146 is rotated to the position shown in FIG. 6 with the portion that is farthest from the center of rotation being in engagement with the cam follower 144 to force the top plate 126 toward the tape transport panel 20 against the urging of the coil spring 148. This causes the top plate 126 to pivot about the attachment to the tape transport panel 20 adjacent the bottom of the top plate 126. In so pivoting the top plate displaces the lug 140 outwardly, thereby pivoting the head wheel panel 62 about the attachment to the bottom plate 124 and out of the plane of the tape transport panel 20. This causes the displacement of the axis of rotation of the head wheel 56 with respect to the direction of tape travel with the result that the head wheel path 120 will be inclined with respect to the video track 122 as seen in FIGS. 10, 11 and 12 so that relative displacement of the head wheel path 120 with respect to the track 122 will be detachable both as to quantity and direction as described above.

In the preferred embodiment it has been found that an inclination of the head wheel path 120 with respect to the track 122 of 0.06° will result in satisfactory detection of relative displacements while maintaining sufficient overlap of the head path 120 on the track 122 to pick up a usable FM signal throughout the range of displacements that occur prior to compensation. This inclination of 0.06° requires a displacement of the cam follower 144 of approximately 1/16 inch.

The cam ring 146 may be rotated by any suitable means such as a rotary solenoid that is actuated when the play back operation is started, and upon completion of the operation, the cam ring is returned to the normal position wherein the head wheel panel 62 is in the plane of the tape transport panel 20.

Figures 14, 15:
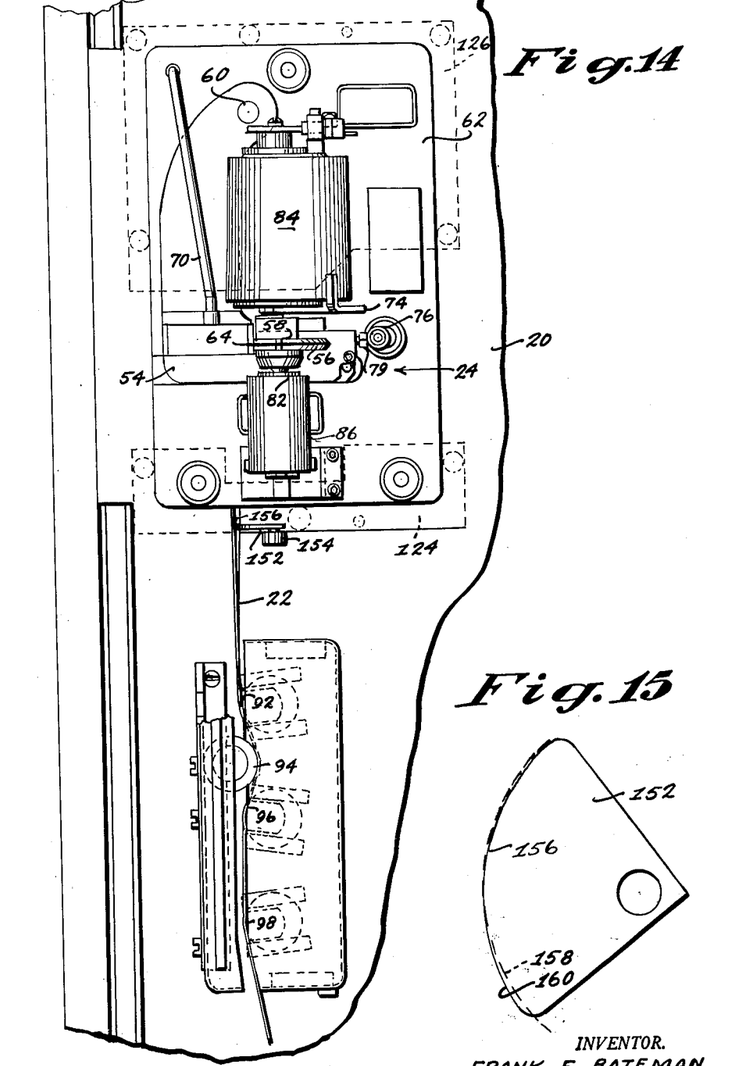
FIG. 14 is a front elevational view of a portion of the tape transport panel including the head wheel panel of a video tape recorder and including a second embodiment of the present invention.
FIG. 15 is a top plan view of the tape guide of the video tape recorder of FIG. 13.

Another embodiment of the present invention obtains an inclination of the pick-up head path with respect to the tape tracks by the means illustrated in FIGS. 14 and 15, wherein a disc 152 is mounted on a bracket 154 on the tape transport panel 20 directly below the head wheel panel 62. This disc 152 has a curved tape engaging surface 156 over which the tape 22 passes as it leaves the head wheel panel 62. At this point the tape normally has a curvature 158 as indicated by the dash line in FIG. 15. However the surface 156 of the disc does not correspond throughout with the normal curvature 158 of the tape but has an end portion 160 of less curvature than the normal tape curvature 158 so that when the tape passes over this surface 156 one side of the tape is distorted outwardly. This lateral distortion of the tape stretches the tape longitudinally and thereby distorts the tape tracks as they pass the pick-up head wheel 56. This will result in a relative displacement of the head wheel path with respect to the tape tracks and will produce a condition somewhat similar to that shown in FIGS. 10, 11 and 12.

Another embodiment of the present invention obtains relative displacement of the head wheel path with respect to the tape track by introducing a very slight nutation in the rate of tape travel so that as the tape track is being scanned by a pick up head the change in the track speed will result in an inclination of the head wheel path with respect to the track. This nutation of the tape speed can be obtained by utilizing a capstan that is slightly eccentric so that as the capstan is driven at a constant speed it will produce a fluctuating tape travel.

Referring again to FIGS. 10–12 it is seen that the inclination of the head wheel path with respect to the tape tracks results in a pick-up signal of pulsating amplitude. This signal can be fed to an oscilloscope to provide a visual indication of relative displacement. In addition the pulsating signal can be fed into an electrical circuit to control the tape drive motor as will presently be described with reference to a preferred embodiment illustrated diagrammatically in FIG. 13.

Figure 13:
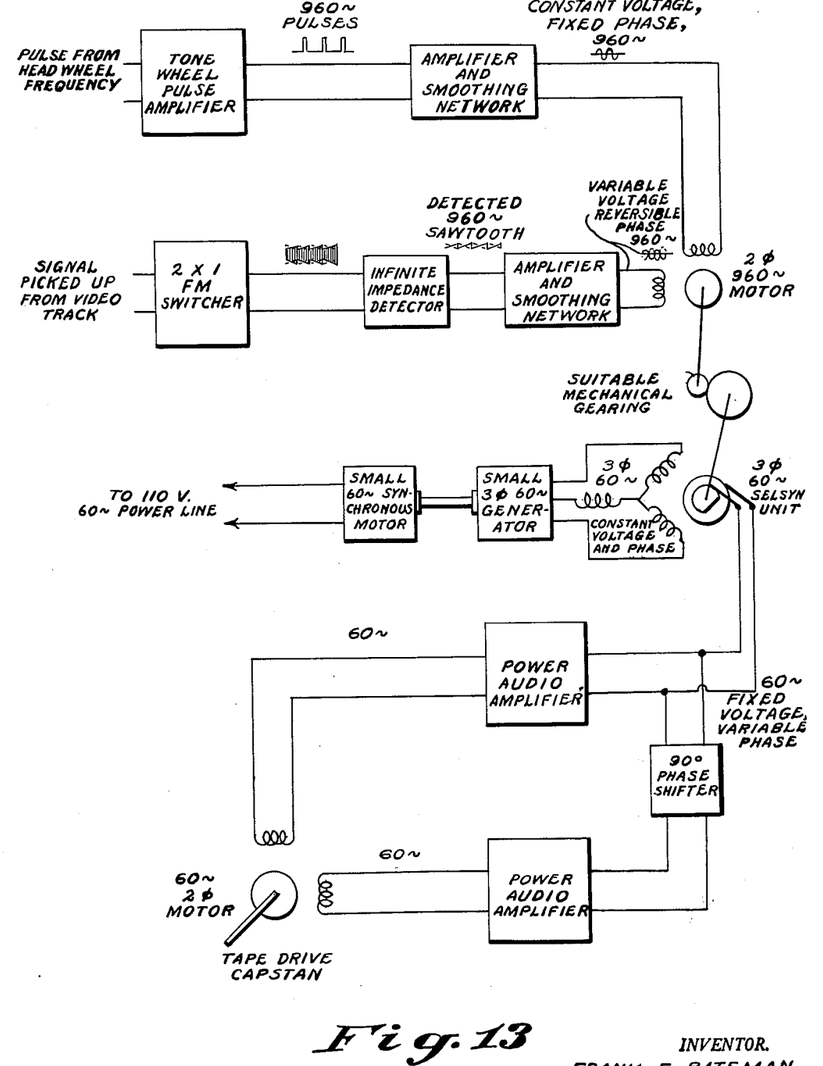
FIG. 13 is a diagrammatic representation of the electrical circuitry through which the signals detected by the pick-up heads are fed to control the tape drive motor.

In this circuit the signal picked up from the magnetic video tracks by the electro-magnetic pick-up heads is fed to a 2 x 1 FM switcher that produces an FM output having a saw toothed configuration. This FM output is then fed into an infinite impedance detector that produces a detected 960 cycle saw tooth wave which is fed to the amplifier and smoothing network to produce a sine curve corresponding to the saw tooth curve. The phase of this sine curve is then compared with the phase of a reference wave of fixed phase such as the pulse of a signal obtained from the rotation of the head wheel, which rotates at a fixed frequency. This head wheel rotation signal is fed through the tone wheel pulse amplifier and amplifier and smoothing network to produce a sine wave.

The signal of the detected pulse picked up from the video track and modified as above is fed to one coil of a 2-phase 960 cycle motor and the fixed phase pulse is fed to the other coil which is 90° out of phase with respect to the first coil. The phases of the two pulses are such that when the head wheel is tracking properly without displacement of the tape track, the video pulse and the fixed pulse will be in phase and the motor will not rotate, but, when relative displacement in one direction occurs, the phase of the video signal will shift in one direction causing the motor to be driven in one direction. Similarly, when relative displacement in the other direction occurs, the phase of the video signal will shift in the other direction causing the motor to be driven in the other direction.

The motor drives mechanical gearing which in turn rotates a 3-phase 60-cycle Selsyn unit. This Selsyn unit is driven by a 3-phase 60-cycle generator that, in turn, is driven by a 60-cycle synchronous motor from a 110 volt 60-cycle power line. The Selsyn unit is normally driven at a fixed 60-cycle frequency with the rotation of the Selsyn unit by the mechanical gearing increasing or decreasing the frequency in accordance with the frequency of rotation imparted by the mechanical gearing.

The output from the Selsyn unit is used with a 90° phase shifter to power a 2-phase 60-cycle motor that rotates the tape drive capstan 30. When there is no relative displacement of the video track with respect to the pick-up head path, the Selsyn output will be 60 cycles and the input to the tape drive motor will be 60 cycles. However, when the tape track is displaced in advance of the head wheel path the pick up signal will be out of phase with respect to the fixed reference signal and the mechanical gearing will be rotated by the first motor to rotate the Selsyn unit in a direction that decreases the original 60-cycle frequency of the 3-phase motor so that the input to the tape capstan drive motor will be less than 60 cycles, thereby reducing the speed of the tape and eliminating the relative displacement. When the displacement is eliminated there is no phase difference between the video signal and the fixed phase reference signal, therefore the tape drive motor is again driven at the 60 cycle rate. Similarly, when the tape track is displaced behind the head wheel path the Selsyn unit will be driven to increase the frequency of the tape drive motor and increase the rate of tape travel until the displacement has been eliminated.

From the above it is apparent that the electronic circuit of the present invention will detect and automatically compensate for any relative displacement of the tape track with respect to the head wheel path and therefore a synchronous relationship will be retained so that a sufficient FM signal will be obtained throughout playback operation of the tape recorder.

The present invention has been described in detail above for purposes of illustration only and is not intended to be limited to video tape recorders or to the particular embodiments for inclining the tape tracks with respect to the pick-up head paths or to the particular electrical control circuit described, or otherwise limited, except as defined in the appended claims.

I claim:

1. A method of detecting the direction and magnitude of relative displacement of the periodic location of indicia on a moving tape that has longitudinally spaced laterally extending portions having control characteristics different than the characteristics of the tape portions therebetween, the method comprising periodically sensing the indicia across said tape along a path on the tape at a slight inclination with respect to said laterally extending portions, the period of said sensing being at a frequency that is a function of the normal rate at which the laterally extending portions on the moving tape pass said sensing and at a location corresponding to the desired periodic location of said laterally extending portions, the inclination of said sensing path with respect to said portions resulting in a pulsation of the amplitude of the sensing across the tape, with relative displacement of the laterally extending portions with respect to said sensing resulting in a change in the pulsation indicative of both magnitude and direction of said relative displacement.

2. The method of detecting the direction and magnitude of relative displacement of the periodic location of indicia on a moving tape according to claim 1 and characterized further in that the inclination of the sensing path with respect to the tape tracks is inclined from a path in which the sensing is maintained parallel to the moving tape track as the sensing moves across the tape.

3. The method of detecting the direction and magnitude of relative displacement of the periodic location of indicia on a moving tape according to claim 1 and characterized further in that the inclination of the sensing path with respect to the tape tracks is accomplished by stretching one side of the tape as it moves past the sensing, thereby displacing the tape tracks to an inclination with respect to the sensing path.

4. The method of detecting the direction and magnitude of relative displacement of the periodic location of indicia on a moving tape according to claim 1 and characterized further in that the inclination of the sensing path with respect to the tape tracks is accomplished by introducing a slight nutation to the speed of the moving tape so that the tape track will fluctuate with respect to the sensing path on the tape.

5. The mehod of detecting the direction and magnitude of relative displacement of the periodic location of indicia on a moving tape that has longitudinally spaced laterally extending portions having control characteristics different than the characteristics of the tape portions therebetween, the method comprising periodically sensing the indicia across said tape along a path on the tape at a slight inclination with respect to said laterally extending portions, the period of said sensing being at a frequency that is a function of the normal rate at which the laterally extending portions on the moving tape pass said sensing and at a location to intersect the desired periodic location of the laterally extending portions inwardly of the ends of said portions, the inclination of said sensing with respect to said portions resulting in a pulsation of the amplitude of the sensing across the tape with maximum amplitude occurring at the intersection of said portion and sensing, relative displacement of the laterally extending portions with respect to said sensing resulting in a change in the location of said intersection that is indicative of the magnitude and direction of said relative displacement.

6. A method of detecting the direction and magnitude of relative displacement of the periodic location of indicia on a moving tape that has longitudinally spaced lateral tracks having magnetic characteristics different than the magnetic characteristics of the tape portions between tracks, the method comprising periodically laterally electro-magnetically scanning said magnetic tracks in a path on said tape that is inclined slightly with respect to said lateral tracks to obtain an electrical signal equivalent to the amount of track being scanned, the frequency of said scanning being a function of the normal rate at which the moving tape tracks pass the scanning and at a location corresponding to the desired periodic location of the tracks, the inclination of said scanning path with respect to said tracks imparting a pulse of fluctuating magnitude to said signal, with relative displacement of the tape track with respect to the scanning path producing a change in the pulse indicative of both magnitude and direction of said relative displacement.

7. A method of detecting the direction and magnitude of relative displacement of the periodic location of indicia on a moving tape that has longitudinally spaced lateral tracks having magnetic characteristics different than the magnetic characteristics of the tape portions between tracks, the method comprising periodically laterally electro-magnetically scanning said magnetic tracks in a path on said tape that is inclined slightly with respect to said lateral tracks with portions of each end of said path being partially out of scanning relation with said tracks in opposite directions a small amount in comparison with the width of each track, the scanning producing an electrical signal equivalent to the portion of the width of track being scanned, the period of said scanning being at a frequency that is a function of the normal rate at which the moving tape tracks pass the scanning and at a location corresponding to the desired periodic location of the tracks, and upon relative displacement of the tape track with respect to the scanning path one end of said path will scan a greater portion of the track width and the other end of the path will scan a lesser portion of the track width, resulting in a lateral shifting of the location of maximum scanning, the direction of said shifting being indicative of the direction of relative displacement and the amount of shifting being indicative of the amount of relative displacement.

8. A method of detecting the direction and magnitude of relative displacement of the periodic location of indicia on a moving tape that has longitudinally spaced lateral tracks having magnetic characteristics different than the magnetic characteristics of the tape portions between tracks, the method comprising periodically laterally electro-magnetically scanning said magnetic tracks in a path on said tape that is inclined slightly with respect to said lateral tracks to obtain an electrical signal equivalent to the amount of track being scanned, the frequency of said scanning being a function of the normal rate at which the moving tape tracks pass the scanning and at a location corresponding to the desired periodic location of the tracks, the inclination of said scanning path with respect to said tracks imparting a pulse of fluctuating magnitude to said signal, with relative displacement of the tape track with respect to the scanning path producing a change in the pulse indicative of both magnitude and direction of said relative displacement, and electro-mechanically moving said tape while applying the changes in said pulse to said drive of said tape to compensate for said relative displacement.

9. A method of detecting the direction and magnitude of relative displacement of the periodic location of indicia on a moving tape that has longitudinally spaced lateral tracks having magnetic characteristics different than the magnetic characteristics of the tape portions between tracks, the method comprising periodically laterally electro-magnetically scanning said magnetic tracks in a path on said tape that is inclined slightly with respect to said lateral tracks to obtain an electrical signal equivalent to the amount of track being scanned, the frequency of said scanning being a function of the normal rate at which the moving tape tracks pass the scanning and at a location corresponding to the desired periodic location of the tracks, the inclination of said scanning path with respect to said tracks imparting a pulse of fluctuating magnitude to said signal, with relative displacement of the tape track with respect to the scanning path producing a change in the pulse indicative of both magnitude and direction of said relative displacement, comprising said pulse with a fixed phase reference signal and using the difference in phase to control movement of the tape to thereby compensate for said relative displacement.

10. Means for detecting the direction and magnitude of relative displacement of the periodic location of indicia on a moving tape, comprising longitudinally spaced laterally extending portions on said tape having control characteristics different than the characteristics of the portions of the tape therebetween, pick-up means sensitive to said control characteristics, means for applying said pick-up means laterally across said tape at a slight inclination with respect to said laterally extending portions and at a rate which is a function of the normal frequency at which the laterally extending portions pass said pick-up means and at a location corresponding to the desired periodic location of said laterally extending portions, the inclination of said pick-up means with respect to said tape portions imparting a pulse to the sense picked up by said pick-up means, with relative displacement of the laterally extending portions with respect to said pick-up means resulting in a change in the pulse that is indicative of both magnitude and direction of said relative displacement.

11. Means for detecting the direction and magnitude of relative displacement of the periodic location of indicia on a moving tape, comprising longitudinally spaced lateral tracks on said tape having control characteristics different than the characteristics of the portions of the tape between tracks, pick-up means sensitive to said control characteristics, means for rotating said pick-up means to pass laterally across said tape in a path with respect to said tape that is slightly inclined with respect to said lateral tracks, said pick-up means being in contact with said tape at a location corresponding to the desired periodic location of said lateral tracks and rotating at a frequency that is a function of the normal rate at which the lateral tracks pass the pick-up means, the inclination of said pick-up means path with respect to said tape tracks imparting a pulse to the sense picked up by said pick-up means, with relative displacement of the lateral tracks with respect to said pick-up means path resulting in a change in the sensing by said pick-up means, which change is indicative of both magnitude and direction of said relative displacement.

12. Means for detecting the direction and magnitude of relative displacement of the periodic location of indicia on a moving tape, comprising longitudinally spaced lateral tracks on said tape having magnetic characteristics different than the characteristics of the portions of the tape between tracks, electro-magnetic pick-up leads capable of obtaining an electrical signal when in contact with said tracks, means for rotating said pick-up heads to pass in scanning relation across said tape in a path on said tap slightly inclined with respect to said lateral tracks and at a frequency that is a function of the normal rate at which the tracks pass the pick-up heads and at a location corresponding to the desired periodic location of said tracks, the inclination of said pick-up head path with respect to said tape tracks imparting a pulse to the signal picked up by said heads, with relative displacement of the tracks with respect to said head path resulting in a change in the pulse of the signal, which change is indicative of both magnitude and direction of said relative displacement.

13. Means for detecting the direction and magnitude of relative displacement of the periodic location of indicia on a moving tape, comprising longitudinally spaced lateral tracks on said tape having magnetic characteristics different than the characteristics of the portions of the tape between tracks, electro-magnetic pick-up heads capable of obtaining an electrical signal when in contact with said tracks, means for rotating said heads to pass in scanning relation across said tape in a path on said tape slightly inclined with respect to said tracks and at a frequency that is a function of the normal rate at which the tracks pass the pick-up heads, the path being in full scanning relation with the middle portion of the normal location of the tracks and being partially out of scanning relation at the ends of the tracks in opposite directions a small amount in comparison with the track width thereby resulting in a pulsating signal being picked-up by said heads, with relative displacement of the tracks with respect to said head path resulting in a lateral shifting of the location of full scanning which shifting is indicative of both magnitude and direction of said relative displacement.

14. In a video tape recorder of the type in which, during playback operation, a tape having recorded magnetic tracks is moved through a head wheel assembly wherein electro-magnetic pick-up heads mounted in a rotating head wheel travel laterally across the tape in scanning relation with said tracks for pick-up and transmission of video signals from said tracks, means for detecting the direction and magnitude of relative displacement of the periodic location of said tracks with respect to the scanning paths of said pick-up heads on the tape comprising means for positioning the tape tracks and pick-up head scanning paths at slight inclinations with respect to each other so that the tracks and paths are out of parallel a small amount in comparison with the width of said tracks, with full scanning occurring substantially at the middle portions of the normal periodic track locations and the ends of the paths being partially out of scanning relation with the ends of the normal track locations, the signal picked up by said heads pulsating from less than maximum at the patrially out of scanning ends to maximum at the fully scanned middle portions when the tracks are in their normal periodic location, and upon relative displacement of said tracks with respect to said paths the scanning relation shifts, increasing the scanning at one end, decreasing the scanning at the other end and shifting the full scanning location in the direction of said one end, thereby shifting the phase of said signal, the direction of said phase shift indicating the direction of relative displacement and the amplitude of said phase shift indicating the magnitude of said relative displacement.

15. The means for detecting the direction and magnitude of relative displacement of tape tracks with respect to pick-up head scanning paths during playback operation of a video tape recorder in accordance with claim 14 and further characterized in that said pick-up heads are mounted in a head wheel, and said head wheel is mounted on the video tape recorder for rotation about an axis inclined slightly with respect to the direction of travel of said tape.

16. The means for detecting the direction and magnitude of relative displacement of tape tracks with respect to pick-up head scanning paths during playback operation of a video tape recorder in accordance with claim 15 and further characterized in that said tape is mounted on a tape transport panel, said pick-up heads are mounted in a rotatable head wheel mounted on a head wheel panel, said head wheel panel being pivotally mounted in said tape transport panel with the head wheel panel normally being in the plane of the tape transport panel wherein the axis of rotation of the head wheel is parallel to the direction of tape travel, and means are provided for pivoting said head wheel panel out of the plane of said tape transport panel to tilt the axis of rotation of said head wheel and thereby incline the pick-up head path with respect to the tape tracks.

17. The means for detecting the direction and magnitude of relative displacement of tape tracks with respect to pick-up head scanning paths during playback operation of a video tape recorder in accordance with claim 16 and further characterized in that said means for tilting said head wheel panel comprises a cam ring mounted for rotation on said tape transport panel, a cam follower extending from said head wheel panel into following engagement with said cam ring, and means for rotating said cam ring from a recording position, wherein the head wheel panel is positioned by the cam ring in the plane of the tape transport panel, to a playback position, wherein the cam ring pivots the head wheel panel out of the plane of the tape transport panel.

18. The means for detecting the direction and magnitude of relative displacement of tape tracks with respect to pick-up head scanning paths during a playback operation of a video tape recorder in accordance with claim 14 and further characterized in that inclination of the tape tracks with respect to the pick-up head scanning paths is produced by means for longitudinally stretching one edge of the tape as it passes the pick-up heads.

19. The means for detecting the direction and magnitude of relative displacement of tape tracks with respect to pick-up head scanning paths during playback operation of a video tape recorder in accordance with claim 18 and further characterized in that said means for longitudinally stretching one edge of the tape comprises a disc mounted on said recorder adjacent said pick-up heads and having a tape engaging surface, the portion of said surface engaging said one edge of the tape being displaced out of the normal tape path to laterally distort said edge and thereby longitudinally stretch said tape edge as it passes the pick-up heads.

20. The means for detecting the direction and magnitude of relative displacement of tape tracks with respect to pick-up head scanning paths during playback operation of a video tape recorder in accordance with claim 14 and further characterized in that inclination of the tape tracks with respect to the pick-up head scanning paths is produced by means for imparting a nutation in the rate of tape travel so that the tape tracks move alternately away from and toward the pick-up head scanning path.

21. The means for detecting the direction and magnitude of relative displacement of tape tracks with respect to pick-up head scanning paths during playback operation of a video tape recorder in accordance with claim 20 and further characterized in that the tape is driven by a capstan that is rotated by drive means, and said capstan is eccentric, thereby imparting said nutation to the tape travel.

22. In a video tape recorder in which, during the playback operation thereof, the tape is moved by a drive motor and a pulsating signal is obtained by pick-up heads that rotate in scanning relation over tracks on the tape, with relative displacement of said tape tracks with respect to the path of the pick-up heads on the tape imparting a change in the phase of said signal, an electrical circuit in which said phase changes are transformed into means for adjusting the speed of the tape drive motor to compensate for said relative displacement, said electrical circuit comprising means for comparing the phase of the signal picked up by said pick-up heads with the fixed phase of a pulse obtained by sensing the frequency of rotation of the rotating head wheel, the signals being in phase when the periodic location of the tape track is in normal operating relation with the scanning path of the pick-up heads, and the pick-up signal being out of phase with the head wheel frequency signal when the periodic location of the tape track is displaced from normal operating relation with respect to the scanning path of the pick-up heads, means for connecting said phase comparing means to the input to said tape drive motor to vary the speed of said tape drive motor in proportion to the difference in phase and thereby change the speed of tape travel to compensate for relative deviations.

23. The electrical circuit for adjusting the speed of the tape drive motor of a video tape recorder to compensate for relative displacement of the periodic location of tracks on the tape with respect to the path of the pick-up heads on the tape according to claim 22 and characterized further in that said means for comparing the phase of the signal picked up by said heads with the fixed phase of the signal obtained from the frequency of rotation the head wheel includes a 2-phase electrical motor with the fixed phase head wheel frequency signal being supplied to one winding of said motor and the signal picked up by the rotation of the pick-up heads being supplied to the other winding of the motor so that when said signals are in phase the motor will be inoperative and when the signals are out of phase due to relative displacement of the periodic location of the tape tracks with respect to the pick-up head paths the phase differences will operate said motor, and said motor is connected to the tape drive motor with operation of said 2-phase motor changing the speed of said tape drive motor in accordance with said phase comparison to compensate for relative displacement.

24. The electrical circuit for adjusting the speed of the drive motor of a video tape recorder to compensate for relative displacement of the periodic location of tracks on the tape with respect to the path of the pick-up heads on the tape according to claim 23 and characterized further in that said 2-phase motor is connected through gearing to a 3-phase Selsyn unit for rotation thereof, the output of said Selsyn unit being connected to the tape drive motor, said Selsyn unit output being of a constant frequency when the 2-phase motor is inoperative and operation of said 2-phase motor rotating said Selsyn unit to change the frequency of the output and thereby change the speed of the tape drive motor.

25. In an apparatus in which a tape or similar article is moved longitudinally by a drive motor and in which displacement of the periodic location of indicia on the tape is detected by a periodically applied electrical detection sensing means and is transferred thereby into an electrical signal with the phase of said signal being indicative of both the direction and magnitude of said displacement, an electrical circuit for adjusting the speed of said tape drive motor to compensate for said displacement comprising means responsive to the application of said sensing means to provide an electrical control signal at the same frequency as said application of said sensing means and at a fixed phase relation with respect thereto, means for comparing the phase of said detection signal with the phase of said control signal, means for applying said phase comparison to said tape drive motor to vary the speed thereof and thereby compensate for said relative displacement.

26. The electrical circuit for adjusting the speed of the tape drive motor of an apparatus in which a tape is moved longitudinally to compensate for displacement of the periodic location of indicia on the tape according to claim 25 and characterized further in that said means for comparing the phase of said detection signal with the phase of said control signal includes a 2-phase electrical motor to change the speed therefor in accordance with of said 2-phase motor and the control signal connected to the other winding of the 2-phase motor, the motor being driven by the differences in phase which result when the periodic location of the indicia on the tape is displaced, and the 2-phase motor being connected to the tape drive motor with the detection signal connected to one winding said phase difference to compensate for said displacement.

27. The electrical circuit for adjusting the speed of the tape drive motor of an apparatus in which a tape is moved longitudinally to compensate for displacement of the periodic location of indicia on the tape according to claim 26 and characterized further in that said 2-phase motor is connected through gearing to a Selsyn unit for rotation thereof in accordance with said phase difference, the output of said Selsyn unit being connected to the tape drive motor, said output being of a constant frequency when said 2-phase motor is inoperative, operation of a 2-phase motor rotating said Selsyn unit to change the frequency of the output signal and thereby change the speed of said tape drive motor to compensate for said displacement.

References Cited in the file of this patent

UNITED STATES PATENTS

| | | |
|---|---|---|
| 2,575,445 | Germer | Nov. 20, 1951 |
| 2,919,314 | Holt | Dec. 29, 1959 |

UNITED STATES PATENT OFFICE
CERTIFICATE OF CORRECTION

Patent No. 3,066,198                               November 27, 1962

Frank F. Bateman

It is hereby certified that error appears in the above numbered patent requiring correction and that the said Letters Patent should read as corrected below.

Column 3, line 43, for "in" read -- an --; column 4, line 43, for "22", first occurrence, read -- 2 --; column 5, line 66, for "to" read -- of --; column 6, line 58, for "inclinnation" read -- inclination --; column 11, line 64, for "comprising" read -- comparing --; column 12, line 38, for "leads" read -- heads --; line 42, for "tap" read -- tape --; column 13, line 19, for "patrially" read -- partially --; column 15, lines 20 and 21, strike out "detection"; line 21, for "transferred" read -- transformed --; line 22, before "signal", first occurrence, insert -- detection --; column 16, line 7, for "to change the speed therefor in accordance with" read -- with the detection signal connected to one winding --; line 13, for "with the detection signal connected to one winding" read -- to change the speed therefor in accordance with --; same column 16, line 23, for "consatnt" read -- constant --.

Signed and sealed this 25th day of June 1963.

(SEAL)
Attest:

ERNEST W. SWIDER
Attesting Officer

DAVID L. LADD
Commissioner of
Patents